US011129254B2

(12) United States Patent
Mao et al.

(10) Patent No.: US 11,129,254 B2
(45) Date of Patent: Sep. 21, 2021

(54) DRIVER WITH CHARGE PUMP CIRCUIT

(71) Applicant: Tridonic GmbH & Co KG, Dornbirn (AT)

(72) Inventors: Qiuxiang Mao, Shenzhen (CN); Guoji Zhong, Shenzhen (CN); Qinghui Chen, Shenzhen (CN); Ruipeng Gao, Shenzhen (CN)

(73) Assignee: Tridonic GmbH & Co KG, Dornbirn (AT)

( * ) Notice: Subject to any disclaimer, the term of this patent is extended or adjusted under 35 U.S.C. 154(b) by 160 days.

(21) Appl. No.: 16/491,598

(22) PCT Filed: Mar. 15, 2018

(86) PCT No.: PCT/CN2018/079172
§ 371 (c)(1),
(2) Date: Sep. 6, 2019

(87) PCT Pub. No.: WO2018/166501
PCT Pub. Date: Sep. 20, 2018

(65) Prior Publication Data
US 2021/0136894 A1     May 6, 2021

(30) Foreign Application Priority Data

Mar. 16, 2017   (CN) .................. 201710156296.X

(51) Int. Cl.
*H05B 45/382*     (2020.01)
*H05B 45/36*      (2020.01)
(Continued)

(52) U.S. Cl.
CPC ............ *H05B 45/382* (2020.01); *H02M 1/12* (2013.01); *H02M 1/4258* (2013.01); *H02M 3/07* (2013.01); *H05B 45/36* (2020.01)

(58) Field of Classification Search
CPC .... H05B 45/382; H05B 45/36; H05B 45/385; H05B 45/10; H05B 45/37; H05B 45/50;
(Continued)

(56) References Cited

U.S. PATENT DOCUMENTS

2004/0257833 A1* 12/2004 Yang ................. H02M 3/33507
363/16

FOREIGN PATENT DOCUMENTS

DE       102009047632 A1   6/2011
WO       2015143612 A      10/2015
WO       2018/137240 A1    8/2018

* cited by examiner

*Primary Examiner* — Wei (Victor) Y Chan
(74) *Attorney, Agent, or Firm* — Spruson & Ferguson (Hong Kong) Limited

(57) ABSTRACT

Disclosed in the present application is a driver for lighting means, preferably light emitting diodes, comprising a charge pump circuit, which is improved based on a common first-stage charge pump circuit. A fifth capacitor is added to connect a power source input end of the charge pump circuit to an LLC or LC circuit, a compensation current is provided for the power source input end using a resonant current generated by a resonant inductance in the LLC or LC circuit, an input angle of a power input current is widened and the input current is smoothed, so as to improve the problems, that a total harmonic distortion is larger and the harmonic does not satisfy the IEC standard, of a single-stage charge pump circuit where the output range is larger. Moreover, compared with a second-stage charge pump circuit that can achieve the equivalent PFC effect, the charge pump circuit disclosed in the present application omits three diode devices and the corresponding connecting wires thereof, and thus has the advantages of a lower cost and smaller circuit volume.

2 Claims, 3 Drawing Sheets

(51) Int. Cl.
*H02M 1/12* (2006.01)
*H02M 1/42* (2007.01)
*H02M 3/07* (2006.01)

(58) Field of Classification Search
CPC ...... H05B 47/19; H05B 47/185; H05B 45/00; H02M 1/12; H02M 1/4258; H02M 3/07; H02M 3/33523; H02M 1/08
See application file for complete search history.

DRIVER WITH CHARGE PUMP CIRCUIT

TECHNICAL FIELD

The present invention relates to the technical field of circuits for lighting means, and in particular to a driver comprising a charge pump circuit for PFC.

BACKGROUND ART

In the field of light emitting diode (LED) drivers with a switched converter like a half-bridge circuit structure, ballasts and other power source circuits with similar functions, the charge pump circuit is a commonly used PFC (Power Factor Correction) solution, and has the advantages of a low cost and high efficiency, etc.

FIG. 1 shows the application of a single-stage charge pump circuit in the prior art. The single-stage charge pump circuit comprises a power source input end $AC_{in}$, a capacitor $C_X$, a capacitor $C_{11}$, a capacitor $C_{12}$, a capacitor $C_{13}$, a single-phase rectifier bridge $BD_{10}$ and a diode $D_{17}$, wherein a live line and a neutral line of the input end AC in are connected to a pin 3 and a pin 4 of the single-phase rectifier bridge $BD_{10}$; the capacitor $C_X$ is provided between the live line and the neutral line; a pin 1 of the single-phase rectifier bridge $BD_{10}$ is connected to a $V_{bus+}$ line of a series oscillation circuit; one end of each of the capacitor $C_{11}$, the capacitor Cu and the diode $D_{17}$ is respectively connected to a pin 2 of the single-phase rectifier bridge $BD_{10}$, wherein the other end of each of the capacitor $C_{12}$ and the diode $D_{17}$ is respectively connected to a $V_{bus-}$ line of the series oscillation circuit, and the other end of the capacitor $C_{11}$ is connected in series with a resonant inductance $L_{30}$ and a transformer $T_{31}$ in the series oscillation circuit; and a plurality of parallel resistors $R_{32}$, $R_{33}$ and $R_{34}$ for monitoring a resonant current may be provided in series between the capacitor $C_{11}$ and the resonant inductance $L_{30}$. During the working process of the above-mentioned circuit, the resonant inductance $L_{30}$ generates a resonant current $I_r$ flowing to the capacitor $C_{11}$, and after the capacitor $C_{11}$ is charged, the resonant current $I_r$ changes into a current $I_{r1}$ flowing to the capacitor $C_{12}$ to charge same. The charging process lasts until when the sum of a voltage $V_{C12}$ across the capacitor $C_{12}$ and an input end voltage $V_{ACin}$ is equal to the sum of a voltage $V_{C13}$ across the capacitor $C_{13}$ and a voltage $V_{BD10}$ across the single-phase rectifier bridge $BD_{10}$, the current $I_{r1}$ no longer charges the capacitor $C_{12}$ and changes into a current $I_{r2}$ flowing to the single-phase rectifier bridge $BD_{10}$ and charges the capacitor $C_{13}$, and at this moment, the input end current is equal to the current $I_{r2}$. The single-stage charge pump circuit has the advantages of a simple structure and low cost, and is a commonly used PFC solution; however, where the output range is wider, there are the problems that the total harmonic distortion is larger and the harmonic does not satisfy the IEC standard.

FIG. 2 shows the application of a second-stage charge pump circuit in the prior art. The second-stage charge pump circuit is based on the above-mentioned first-stage charge pump circuit with a capacitor $C_{10}$ and three diode devices $D_{14}$, $D_{15}$ and $D_{16}$ added. Compared with the single-stage charge pump circuit, the second-stage and multi-stage charge pump circuits can prevent the problem of the existence of total harmonic distortion and a harmonic in a wider output range; however, it can be seen from FIG. 2 that it is only for widening the output range of the charge pump circuit to satisfy the IEC standard that a plurality of components are added to the second-stage charge pump circuit, which makes the circuit structure thereof more complicated, thus increasing the production cost and product volume, and this does not meet the development trend of miniaturization and precision of modern electronic products.

SUMMARY OF THE INVENTION

It is an object of the present invention to make an improvement based on the common single-stage charge pump circuit, so as to solve the problems of the total harmonic distortion and harmonics existing in a first-stage charge pump circuit in a wider output range.

The driver for lighting means, preferably light emitting diodes, comprising a charge pump circuit operating as power factor correction circuit (PFC circuit) provided in the present invention comprises a power source input end, a single-phase rectifier bridge, a diode, a first capacitor, a second capacitor, a third capacitor, a fourth capacitor and a fifth capacitor, wherein the power source input end comprises two input lines, namely a live line and a neutral line; the single-phase rectifier bridge comprises a first pin, a second pin, a third pin and a fourth pin, and the first pin is mutually diagonal to the second pin, the third pin and the fourth pin; the live line and the neutral line are respectively connected to the third pin and the fourth pin of the single-phase rectifier bridge; the first capacitor is provided between the live line and the neutral line; the first pin of the single-phase rectifier bridge is connected to a $V_{bus+}$ line of a series oscillation circuit (LLC) or oscillation circuit (LC) switch module; a first end of each of the second capacitor, the third capacitor and the diode is respectively connected to the second pin of the single-phase current bridge, a second end of the second capacitor is connected to one end of a resonant inductance or a transformer away from the switch module in the series oscillation circuit (LLC) or the oscillation circuit (LC), and a second end of each of the third capacitor and the diode is connected to a $V_{bus-}$ line of the series oscillation circuit (LLC) or oscillation circuit (LC) switch module; the fourth capacitor is provided between the $V_{bus+}$ line and the $V_{bus-}$ line; and the fifth capacitor is provided between the power source input end and the series oscillation circuit (LLC) or oscillation circuit (LC) to provide a compensation current for an input current of the power source input end.

As an alternative, the fifth capacitor being provided between the power source input end and the series oscillation circuit (LLC) or oscillation circuit (LC) comprises: a first end of the fifth capacitor being connected to the live line or the neutral line of the power source input end, and a second end of the fifth capacitor being connected to the second end of the second capacitor.

As an alternative, providing a compensation current for an input current of the power source input end comprises: the resonant inductance in the series oscillation circuit (LLC) or oscillation circuit (LC) generating a resonant current flowing to the second capacitor and the fifth capacitor, and when the sum of a voltage across the third capacitor and a voltage across the power source input end is greater than or equal to a voltage across the fourth capacitor, the resonant current branching out the compensation current to flow to the power source input end along the line where the fifth capacitor is located, until the single-phase rectifier bridge is turned on.

The present invention has the advantages as follows: by adding, to a first-stage charge pump circuit structure, a capacitor device for connection to a power source input end of the charge pump circuit and a series oscillation circuit (LLC) or an oscillation circuit (LC), providing a compensation current for the power source input end, widening an input angle of a power input current and smoothing the input current, so as to improve the problems, that a total harmonic distortion is larger and the harmonic does not satisfy the IEC standard, existing in a single-stage charge pump circuit where the output range is wider. Also, compared with a second-stage charge pump circuit that can achieve the equivalent PFC effect, the charge pump circuit disclosed in the present invention omits three diode devices and the corresponding connecting wires thereof, and has the advantages of a lower cost and smaller circuit volume.

DETAILED DESCRIPTION OF THE DRAWINGS

The present invention will be further described in detail below with reference to the accompanying drawings and in combination with specific embodiments.

Figure 1:
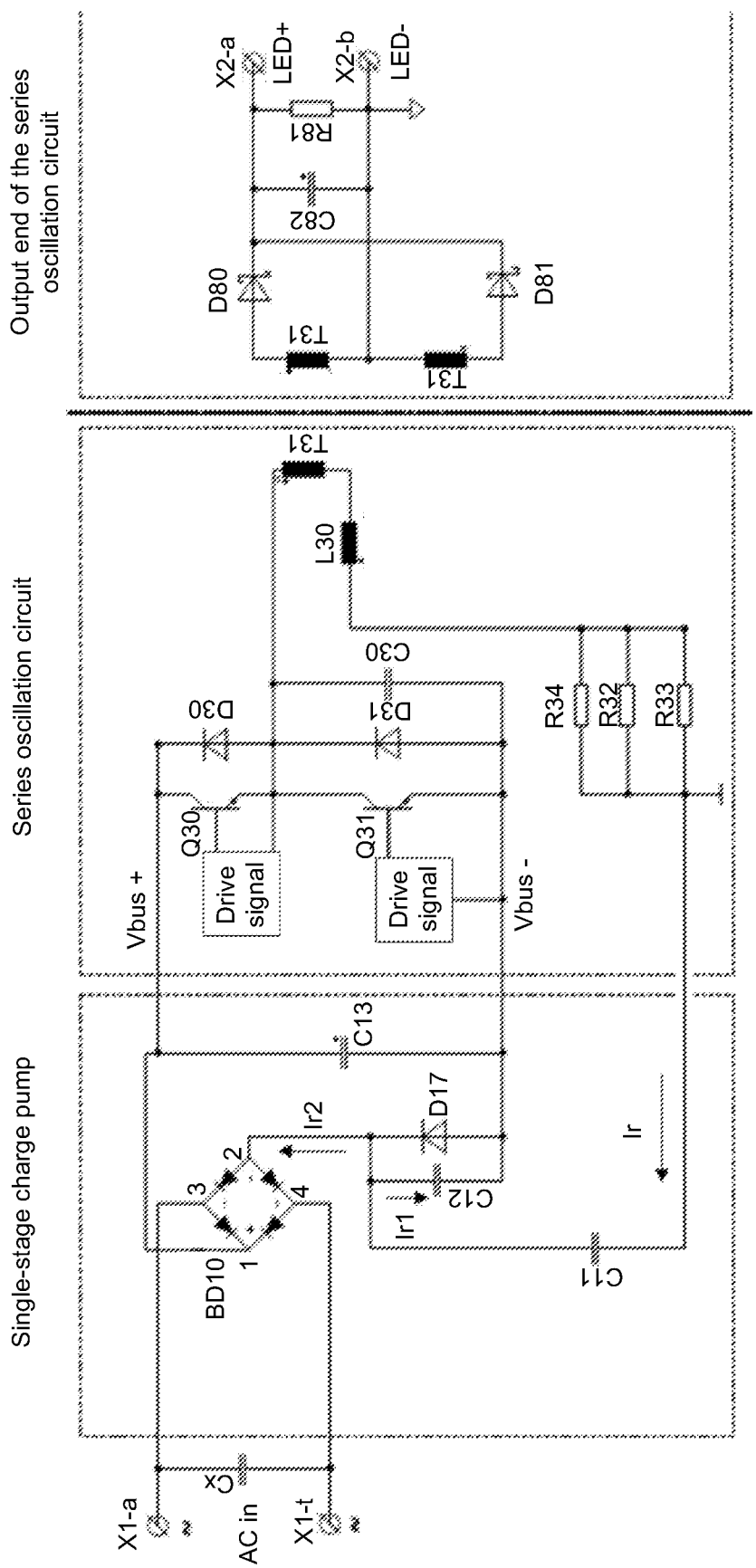
FIG. 1 is a schematic diagram of application of a single-stage charge pump circuit in the prior art.
Figure 2:
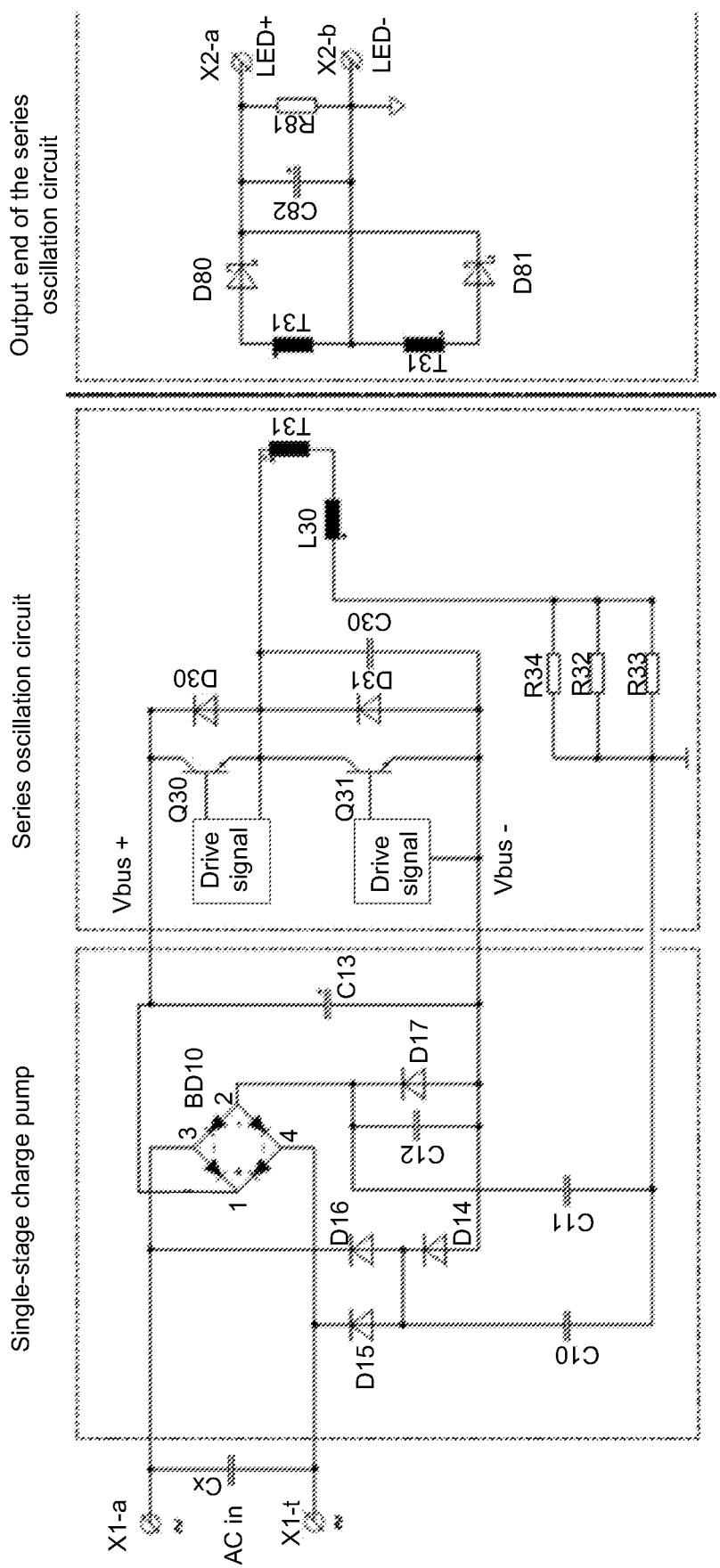
FIG. 2 is a schematic diagram of application of a second-stage charge pump circuit in the prior art.
Figure 3:
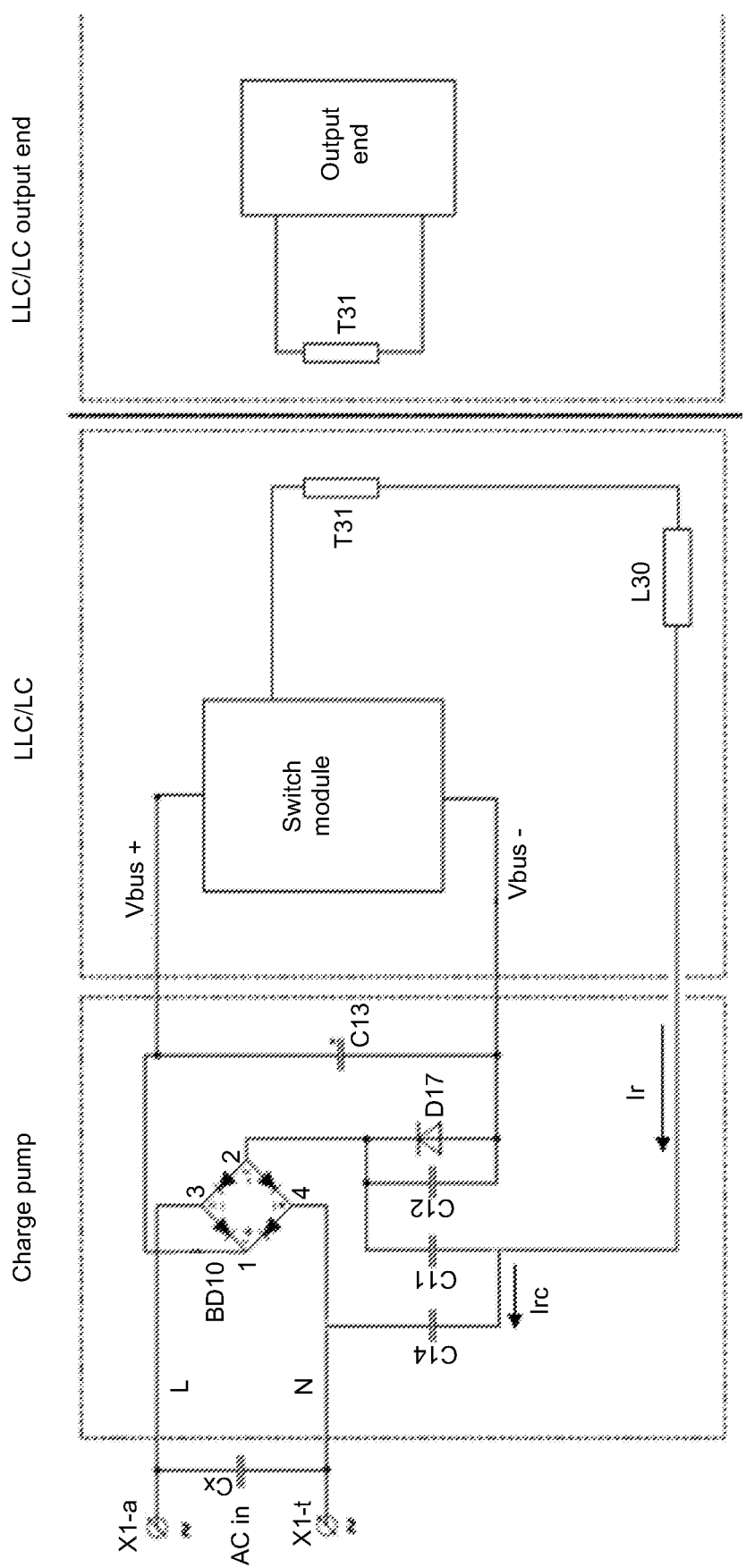
FIG. 3 is a schematic diagram of application of a driver comprising a charge pump circuit for PFC provided by the embodiments of the present invention.

The driver for lighting means, preferably light emitting diodes, provided in an embodiment of the present invention, as shown in FIG. 3, comprises a charge pump circuit. It comprises a power source input end ($AC_{in}$), a single-phase rectifier bridge ($BD_{10}$), a series oscillation circuit (LLC) or oscillation circuit (LC) comprising a switch module, preferably formed by a half-bridge, and resonant inductance ($L_{30}$) or a transformer ($T_{31}$). It further a diode ($D_{17}$), a first capacitor ($C_X$), a second capacitor ($C_{11}$), a third capacitor ($C_{12}$), a fourth capacitor ($C_{13}$) and a fifth capacitor ($C_{14}$), wherein the power source input end ($AC_{in}$) comprises two input lines, namely a live line (L) and a neutral line (N); the single-phase rectifier bridge ($BD_{10}$) comprises a first pin (1), a second pin (2), a third pin (3) and a fourth pin (4), wherein the first pin (1) is mutually diagonal to the second pin (2), the third pin (3) and the fourth pin (4); the live line (L) and the neutral line (N) are respectively connected to the third pin (3) and the fourth pin (4) of the single-phase rectifier bridge ($BD_{10}$); the first capacitor ($C_X$) is provided between the live line (L) and the neutral line (N); the first pin (1) of the single-phase rectifier bridge ($BD_{10}$) is connected to a positive direct current supply line ($V_{bus+}$ line) of a series oscillation circuit (LLC) or oscillation circuit (LC) switch module; a first end of each of the second capacitor ($C_{11}$), the third capacitor ($C_{12}$) and the diode ($D_{17}$) is respectively connected to the second pin (2) of the single-phase current bridge ($BD_{10}$), a second end of the second capacitor ($C_{11}$) is connected to one end of a resonant inductance ($L_{30}$) or a transformer ($T_{31}$) away from a switch module in the series oscillation circuit (LLC) or oscillation circuit (LC), and a second end of each of the third capacitor ($C_{12}$) and the diode ($D_{17}$) is connected to a $V_{bus-}$ line of the series oscillation circuit (LLC) or the oscillation circuit (LC) switch module; the fourth capacitor ($C_{13}$) is provided between the $V_{bus+}$ line and the $V_{bus-}$ line; and the fifth capacitor ($C_{14}$) is provided between the power source input end ($AC_{in}$) and the series oscillation circuit (LLC) or oscillation circuit (LC) to provide a compensation current for an input current of the power source input end ($AC_{in}$). The charge pump circuit works as a power factor correction circuit (PFC circuit).

The charge pump circuit for a driver for lighting means, preferably light emitting diodes, provided in an embodiment of the present invention is a first-stage charge pump circuit in the prior art when the fifth capacitor ($C_{14}$) is not added thereto, and the first-stage charge pump circuit can basically satisfy the application requirements in the driver circuit; however, where the output range is wider, there are problems that the total harmonic distortion is larger and the harmonic does not satisfy the IEC standard. The charge pump circuit for the driver provided in an embodiment of the present invention provides, by adding the fifth capacitor ($C_{14}$), connecting the power source input end ($AC_{in}$) and the LLC or LC circuit and introducing a partial resonant current generated by a resonant inductance in the LLC or LC circuit to the power source input end ($AC_{in}$), a compensation current for the power input current, widens an input angle of the input current and smooths the input current, so that the circuit achieves a better power factor, total harmonic distortion and harmonic effects in a wider input range and also satisfies the IEC standard.

Optionally, the fifth capacitor being provided between the power source input end and the series oscillation circuit (LLC) or oscillation circuit (LC) comprises: a first end of the fifth capacitor being connected to the live line or the neutral line of the power source input end, and a second end of the fifth capacitor being connected to the second end of the second capacitor. As shown in FIG. 3, a first end of the fifth capacitor ($C_{14}$) is connected to the neutral line (N) of the power source input end ($AC_{in}$) and a second end of the fifth capacitor ($C_{14}$) is connected to the second end of the second capacitor ($C_{11}$), that is, the second ends of the fifth capacitor ($C_{14}$) and the second capacitor ($C_{11}$) are jointly connected to one end of the resonant inductance ($L_{30}$) away form the switch module in the series oscillation circuit (LLC) or oscillation circuit (LC).

FIG. 3 shows an example of a clocked converter comprising a switch module and a transformer $T_{31}$ according to the invention. The clocked converter comprising a switch module and a transformer ($T_{31}$) according to the invention may form a part of a driver for operating a light source, preferably a LED. The clocked converter may be also formed by a flyback converter or another isolated converter topology comprising a transformer ($T_{31}$) which is fed with a voltage provided by the $V_{bus+}$ line and chopped at high frequency by the switch module. The transformer ($T_{31}$) and optionally the resonant inductance ($L_{30}$) of the clocked converter is coupled to the charge pump circuit according to this invention comprising a second capacitor ($C_{11}$) and a fifth capacitor ($C_{14}$).

Optionally, providing a compensation current for an input current of the power source input end comprises: the resonant inductance in the series oscillation circuit (LLC) or oscillation circuit (LC) generating a resonant current flowing to the second capacitor and the fifth capacitor, and when the sum of a voltage across the third capacitor and a voltage across the power source input end is greater than or equal to a voltage across the fourth capacitor, the resonant current branching out the compensation current to flow to the power source input end along the line where the fifth capacitor is located, until the single-phase rectifier bridge is turned on. As shown in FIG. 3, the resonant inductance ($L_{30}$) in the series oscillation circuit (LLC) or oscillation circuit (LC) generates a resonant current ($I_r$) flowing to the second capacitor ($C_{11}$) and the fifth capacitor ($C_{14}$), and when the sum of a voltage across the third capacitor ($C_{11}$) and a voltage across the power source input end ($AC_{in}$) ≥ a voltage across the fourth capacitor ($C_{13}$), the resonant current ($I_r$)

branches out a compensation current ($I_C$) to flow to the power source input end ($AC_{in}$) along the line where the fifth capacitor ($C_{14}$) is located until the single-phase rectifier bridge ($BD_{10}$) is turned on. The compensation current ($I_{rC}$) widens an input angle of a power input current and smooths the input current, so as to improve the problems, that a total harmonic distortion is larger and the harmonic does not satisfy the IEC standard, existing in a single-stage charge pump circuit where the output range is wider. Also, compared with a second-stage charge pump circuit that can achieve the equivalent PFC effect, the charge pump circuit disclosed in the present invention omits three diode devices and the corresponding connecting wires thereof, and has the advantages of a lower cost and smaller circuit volume.

It should be finally illustrated that the above embodiments are only used to illustrate the technical solutions of the present invention, but not as a limitation to the present invention. A person of ordinary skill in the art should know that the technical solutions stated in the above-mentioned embodiments may still be modified or equivalent replacements may be made to some or even all of the technical features without making any creative efforts, and these modifications or replacements do not make the essence of the corresponding technical solutions depart from the scope of the technical solutions of the present invention.

The invention claimed is:

1. A LED driver circuit connected to light emitting diodes, the LED driver circuit comprising a charge pump circuit, the charge pump circuit comprising a power source input end, a single-phase rectifier bridge, a diode, a first capacitor, a second capacitor, a third capacitor, a fourth capacitor and a fifth capacitor, wherein:
   the power source input end comprises two input lines, namely a live line and a neutral line;
   the single-phase rectifier bridge comprises a first pin, a second pin, a third pin and a fourth pin, wherein the first pin is mutually diagonal to the second pin, the third pin and the fourth pin;
   the live line and the neutral line are respectively connected to the third pin and the fourth pin of the single-phase rectifier bridge;
   the first capacitor is provided between the live line and the neutral line;
   the first pin of the single-phase rectifier bridge is connected to a $V_{bus+}$ line of a series oscillation circuit (LLC) or oscillation circuit (LC) switch module;
   a first end of each of the second capacitor, the third capacitor and the diode is respectively connected to the second pin of the single-phase current bridge;
   a second end of the second capacitor is connected to one end of a resonant inductance or a transformer away from the switch module in the series oscillation circuit (LLC) or the oscillation circuit (LC);
   a second end of each of the third capacitor and the diode is connected to a $V_{bus-}$ line of the series oscillation circuit (LLC) or oscillation circuit (LC) switch module;
   the fourth capacitor is provided between the $V_{bus+}$ line and the $V_{bus-}$ line; and
   the fifth capacitor is provided between the power source input end and the series oscillation circuit (LLC) or oscillation circuit (LC) to provide a compensation current for an input current of the power source input end.

2. The LED driver circuit according to claim 1, wherein the fifth capacitor is provided between the power source input end and the series oscillation circuit (LLC) or oscillation circuit (LC), a first end of the fifth capacitor being connected to the live line or the neutral line of the power source input end, a second end of the fifth capacitor being connected to the second end of the second capacitor.

* * * * *